United States Patent [19]

Reid

[11] Patent Number: 5,073,303
[45] Date of Patent: Dec. 17, 1991

[54] PHOTOCHROMIC EMULSION

[75] Inventor: Jerome L. Reid, Wayland, Mass.

[73] Assignee: BSG, Inc., West Newton, Mass.

[21] Appl. No.: 547,700

[22] Filed: Jul. 2, 1990

Related U.S. Application Data

[62] Division of Ser. No. 209,414, Jun. 20, 1988, Pat. No. 5,015,416.

[51] Int. Cl.$^5$ .............................................. G02B 5/20
[52] U.S. Cl. ..................... 252/584; 430/267; 430/266; 430/567; 430/568; 430/569; 359/609; 359/580; 359/241
[58] Field of Search ................. 350/284, 164; 252/584, 252/586; 430/267, 266, 567, 568, 569

[56] References Cited

U.S. PATENT DOCUMENTS

| | | | |
|---|---|---|---|
| 4,049,567 | 9/1977 | Chu et al. | 252/300 |
| 4,049,846 | 9/1977 | Hovey | 350/354 |
| 4,110,244 | 8/1978 | Hovey | 252/300 |
| 4,556,605 | 12/1985 | Mogami et al. | 252/586 X |
| 4,596,673 | 6/1986 | Beale | 252/586 |
| 4,942,119 | 7/1990 | Ozin et al. | 430/567 X |

Primary Examiner—Robert L. Stoll
Assistant Examiner—Richard Treanor
Attorney, Agent, or Firm—Gaston & Snow

[57] ABSTRACT

A photochromic material adapted for coating light transmissive materials. The photochromic material contains photosensitive silver halide crystals having dimensions in the range of approximately 50 Angstroms to 800 Angstroms. The silver halide crystals are surface doped with copper ions and another sensitizer selected from mild reducing agents or sulfur-bearing ions. The crystals are dispersed in a protective polymer that does not irreversibly bind halogen.

18 Claims, 1 Drawing Sheet

PHOTOCHROMIC EMULSION

This application is a divisional application of my copending application Ser. No. 209,414, filed June 20, 1988, now U.S. Pat. No. 5,015,416.

The present invention relates to photochromic materials and more particularly is directed to photochromic polymers.

The term "photochromic" as used herein is intended to refer to light transmissive materials that darken or occlude light transmission when exposed to visible or near visible radiant energy, but regain their transmissivity a short time after removal of the actinic electromagnetic radiation. A large number of photochromic compounds are known but many have only limited useful lives. This is especially true of organic photochromic substances that are subject to irreversible degradations which reduce the amount of radiation-responsive material available for occluding light.

Silver halide particles have been found to be a very useful photochromic material, and glass has been the preferred matrix for photochromic silver halide particles. The silver halide particles are typically formed in situ in molten glass using high temperature techniques. After the glass has been formed and appropriately annealed to generate photochromic particles, ultraviolet and short wavelength visible light will cause the silver halide particles to decompose to elemental silver and halogen atoms. The glass is believed to provide a microscopic environment wherein the halogen atoms remain in close proximity to the elemental silver for recombination after removal of the activating light. In addition, the halogen atoms do not appear to participate in irreversible reactions with other components of the glass so that the halogen remains available for the reverse reaction. Examples of photochromic glasses are found in U.S. Pat. Nos. 3,208,860, 4,550,087 and 4,076,542, and the references cited therein.

The major drawbacks to the use of glass as a matrix for photochromic substances are its weight and high cost of manufacture. Attempts have been made to impart silver halide-based photochromic properties to windows, ophthalmic lenses and other articles made from transparent polymeric materials that are lighter and less expensive to manufacture than glass and that mimic properties of photochromic glass. However, such attempts have not been particularly commercially successful.

Generally, rapid darkening in the presence of light and fast fading after removal of the activating light are the properties most desirable in photochromic materials. However, the color is also important. The initial color as well as any shift in color upon exposure to light must be psychologically acceptable to the consumer, and color considerations are especially important in the ophthalmic lens industry.

Additionally, the size and shape of the halide particles are also important in the commercial photochromic products, because if the particles are near 0.1 microns (1000 Angstrom units), scattering of light will occur to produce a hazy lens that is visually unacceptable.

Where it is intended to incorporate silver halides into a polymeric matrix, the silver halide particles need to be shielded from the chemical effects of the polymerizing materials, e.g. catalysts and initiators that may have a deactivating effect on the photosensitive particles. The deactivating effect is believed to result at least in part from the easy oxidization of the silver halide by, for example, peroxides used as initiators in the casting process. As described in U.S. Pat. Nos. 4,046,586 and 4,596,673, attempts have been made to address this problem, but apparently without commercial success.

Although a number of interesting techniques have been developed in attempts to duplicate in photochromic polymers, the performance of silver halide particles in a glass matrix, apparently none have yielded a commercially feasible ophthalmic lens product. For example, the Visenza lenses offered commercially by PPG Corp. were available only as non-prescription lenses and are believed to have been withdrawn from the market. Plastic photochromic lenses are offered in the U.S. by Sola Optical and in Europe by Rodenstock, but it is believed that these lenses too are only available in non-prescription form. Examples of some of those interesting techniques, which may be considered material to the present invention, are disclosed in the following patents and the references cited therein:

U.S. Pat. No. 4,046,586 issued to Uhlmann et al discloses the preparation of silver halide in polymer compositions for ophthalmic use. Particles of silver halide, with dimensions between 30 and 10,000 Angstrom units and internally doped with $Cu^+$ or other cations are first formed. A coating of a halogen impervious layer of metal oxide such as $Al_2O_3$, $SiO_2$ or $TiO_2$ is formed around the particles allegedly to (a) prevent diffusion of halogen out of the crystal and (b) render them sufficiently resistant to the effects of oxygen, moisture, or the effects of catalysts or other chemical ingredients in the polymer composition that would inhibit the functioning of the photochromic silver halide. Up to about 10 wt % of the coated particles are then incorporated into a polymeric material used in forming a lens.

U.S. Pat. No. 4,049,567 issued to Chu discloses the preparation of polymer matrices, with particular emphasis on polyvinylpyrolidone and polyvinylalcohol, containing activated silver halide particles of less than 1000 Angstrom units. The silver halide particles are internally doped with $Cu^+$, other metal cations, or $S^=$ in the presence of the above-mentioned polymers which act as crystal growth inhibitors. The product requires a plasticizer such as water, glycerin, ethylene glycol, polyethylene glycols, and mixtures thereof to produce an environment suitable for repetitive activations and deactivations of the silver halide particles. It is asserted that the polymer must retain the plasticizer to keep its photochromic property and may be sealed between glass plates to prevent the loss of plasticizer and hence photochromic activity.

U.S. Pat. No. 4,106,861 issued to Wright discloses a photochromic system alleged to be characterized by a reduced haze. Light transmissive articles are formed by evaporating photochromic silver halide onto plastic coated with a material substantially impermeable to halogens. The silver halide is coated with a layer of metal such as gold, platinum, palladium and chromium and then laminated to another sheet of plastic coated with a material substantially impermeable to halogens.

U.S. Pat. No. 4,110,244 issued to Hovey discloses the preparation of a silver halide in transparent polyester materials by first forming a transparent polymer, swelling a surface layer of the cured polymer with a polar solvent such as methanol, absorbing silver and halide ions into the swelled surface layer and evaporating solvent to cause the swelled surface layer to collapse, trapping silver halide particles in the surface layer of the plastic.

U.S. Pat. No. 4,556,605 issued to Mogami et al discloses a photochromic coating composition and photochromic synthetic resin ophthalmic lens. The coating composition includes an organic silicon compound or its hydrolyzate, and silver halide as a preferred photochromic material dispersed therein.

U.S. Pat. No. 4,578,305 issued to Postle et al discloses a photochromic assembly in which crushed photochromic glass beads from 0.05 to 50 microns in size are embedded in plastic. This process is subject to the increased costs associated with melting, manufacturing, and crushing of glass.

U.S. Pat. No. 4,581,283 issued to Barnhart et al discloses an essentially transparent glass/plastic composite consisting of photochromic glass particles having water-free surfaces and dispersed within a plastic matrix. The glass particles constitute up to 50 wt % of the material and have a refractive index compatible with the matrix. This process has not succeeded in avoiding the high cost of manufacturing the glass particles.

U.S. Pat. No. 4,596,673 issued to Beale teaches dispersing silver halide particles ranging in size from about 24A to 150A in a monomer such as hexamethyldisiloxane that is glow-discharge polymerized.

Other examples of photochromic polymer materials are provided in U.S. Pat. Nos. 4,489,108 and 4,367,170 and references cited therein.

While the photosensitivity of silver halide particles also has been found useful in photographic imaging systems, only an irreversible photo-induced chemical change is sought in silver halide containing photographic materials. Recombination of the elemental silver and halogen in photographic film would lead to destruction of the latent photographic image. Examples of photographic materials are provided in U.S. Pat. Nos. 3,479,186, 4,246,337, 4,323,640, 4,347,309 and 4,400,463, and UK Patents 2,110,405A and 2,063,499B and the references cited therein.

Considerable potential savings of monies are likely from the replacement of standard windows by photochromic windows that respond to actinic radiation during the summer months to block visible and/or infra-red transmission and thus reduce air conditioning requirements through reduction of thermal gain, and/or retain heat during winter months to reduce demand for non-renewable energy resources.

Accordingly, a principal object of the present invention is to provide a photochromic product comprising a polymeric matrix.

Yet another object of the present invention is to provide such a product for use with light-transmissive materials.

Other objects of the present invention are to provide such a product for coating light transmissive materials; to provide such a product that is not subject to irreversible degradations that reduce its photochromic activity during the desired life of the product and does not exhibit increasingly long recovery periods after each cycle; and to provide such a product for coating light-transmissive, synthetic resin materials to produce photochromic and light polarizing lenses having low haze levels under illumination.

Still other objects of the present invention are to provide a photochromic silver halide in polymer for coating window glazing to impart to the window the ability to respond photochromically to incident light; and to provide such a photochromic silver halide in polymer that may be applied to glass and plastic sheets or panes for a wide variety of uses.

The invention accordingly comprises the process and the several steps and relation of one or more of such steps with respect to the others, and the products and compositions possessing the features, properties and relation of elements that are exemplified in the following detailed disclosure, and the scope of the application of which will be indicated in the claims.

Generally, to achieve the foregoing and other objects, the present invention provides an essentially haze-free material comprising silver halide in polymer, the material preferably being applied as a coating to light-transmissive and/or light-reflective substrates. The material contains photosensitive silver halide particles having dimensions in the range of approximately 50 to 1,000 Angstrom units, the particles being dispersed in a protective colloid that reversibly binds halogen.

A primary use contemplated for the material of the invention is for forming photochromic polymer membranes on light transmissive materials including, but not limited to, ophthalmic lenses, window glazings, skylights, overhangs, car windshields, camera filters, telescopes, binoculars, greenhouses and the like to control UV and visible radiation and glare.

For a fuller understanding of the nature and objects of the present invention, reference should be had to the following detailed description taken in connection with the accompanying drawings wherein.

Figure 1:
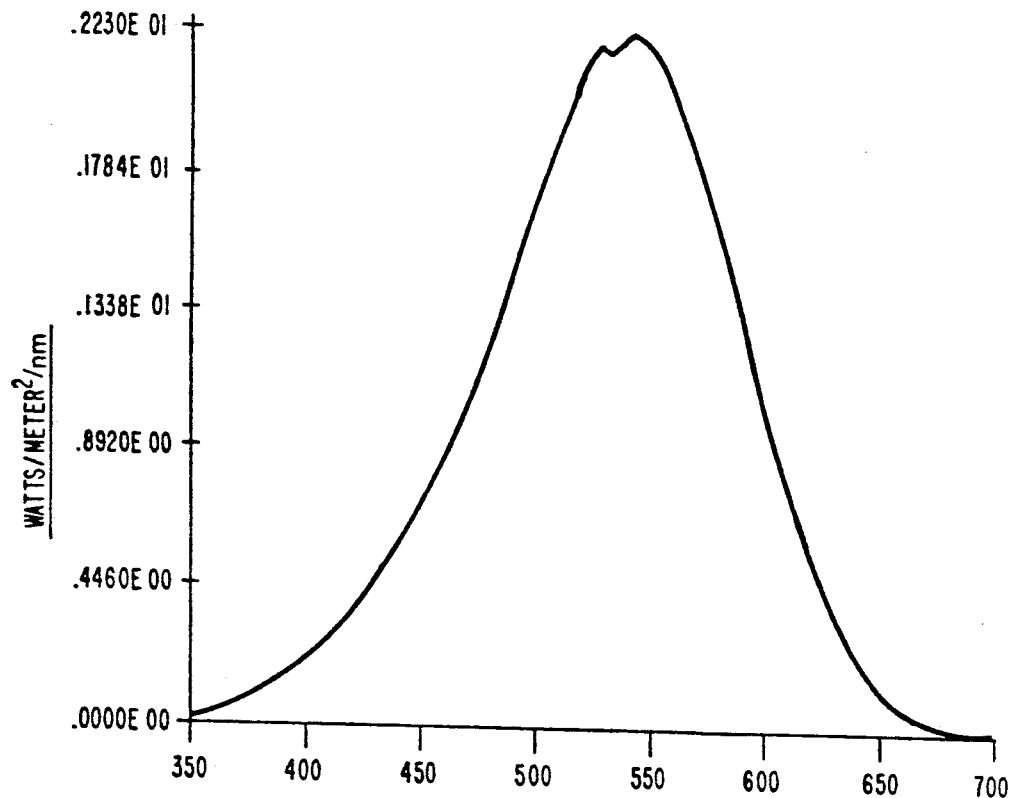
FIG. 1 is a spectral curve of the characteristics of one light source used to evaluate specimens formed according the principles of the present invention.

The present invention is particularly embodied in a material comprising photochromic silver halide particles in a polymeric matrix and the method of making same, such material being particularly useful in forming polymeric membranes for use with light transmissive materials. An emulsion is preferably first formed of surface-doped, silver halide particles having dimensions in the range of approximately 50 Angstroms to 1000 Angstroms, suspended in a polymeric solution. The silver halide particles are typically chosen from the group of AgCl, AgBr and AgI and mixtures thereof. The silver halide particles are surface doped or activated with $Cu^+$ ions, $Cu^{++}$ ions and mixtures thereof, and also with ions chosen from the group of $S^=$, $R\text{-}S^-$, $S_2O_3^=$, and/or mild reducing agents, such as ascorbic acid, and mixtures thereof, R being an organic radical such as an alkyl, alkylidene, alkene, alkadiene, aryl, alkaryl and the like. A membrane is typically formed by coating an inert substrate with the photochromic silver halide emulsion in a polymer with a colloid (or non-colloidal addendum) that will not irreversibly bind halogens produced during subsequent photolysis of the silver halide particles. The membrane can be applied under room or red light conditions.

In the present invention, silver halide particles, which will confer photochromic characteristics upon a polymeric matrix, are synthesized by a continuous nucleation method. To this end, a solution of silver ions may be prepared in an either aqueous or nearly non-aqueous medium. If the particles are to be prepared in a nonaqueous solvent-based system, then water may subsequently be removed. The silver cations can readily be provided by dissolving such soluble silver salts as silver acetate, silver trifluoroacetate, silver nitrate, and the like, in water. The initial concentration of the silver ions in solution can vary widely, for example from as low as 0.001 to as high as 7.0 molar and even higher, but is preferably lowered for use in the formation of the silver halide particles. A water soluble polymer that will not bind either silver or halide ions irreversibly (typically polyvinyl pyrrolidone, polyvinyl alcohol, polycarboxylic acids, polysulphonic acids, polyethers, and copolymers thereof, or the like), is added in a low concentration, preferably not more than 10 wt. %, to provide a protective environment for controlled silver halide grain growth. Growth controlling addenda and monomeric or polymeric surfactants may optionally be added.

A second solution containing halide salts is also prepared. The halide salts are typically provided as aqueous salt solutions of such soluble halide salts as ammonium, quaternary ammonium, alkali metal (e.g. lithium, sodium or potassium), or alkaline earth metal (e.g. magnesium or calcium) halides, and can be one or more of the several halides such as bromides, iodides and chlorides in such proportions as may be desired. The initial halide salt solution may also vary widely in concentrations between from 0.001 to higher than 7.0 molar, but should be reduced to around 0.1M or less for use. As in the silver solution, there may be also added less than 10 wt % of a protective water-soluble polymer that will not irreversibly bind silver or halide ions, the polymer being for convenience, but not necessarily, the same as that used in the silver solution.

The silver ion and halide ion solutions, adjusted to preferably 0.1M or less, are then mixed together, preferably in stoichiometric quantities or with a slight excess of halide ion to provide a net negative charge that will aid in maintaining the stability of the silver halide formed. Mixing should take place while controlling such parameters as temperature, ion concentrations, pH, agitation and the like, so as to promote a reaction that will form silver halide particles of the most advantageous size and shape for photochromic use, typically a Lippman-type emulsion in which the silver halide particles are of colloidal dimensions. The silver halide particles are preferably synthesized by a continuous nucleation method, employing triple or double jet precipitation techniques. The size of the particles formed should be less than about 800 Å and preferably less than 500 Å. The precise control of shape and size of the particles can be readily achieved using well established methods for the preparation of silver halide emulsions for photographic use.

After the first and second solutions are mixed and the silver halide particles formed, a crystal growth inhibitor may be added to the emulsion to retard the growth of the silver halide particles and maintain the particle size below 800 Angstrom units. Examples of well known and commercially available silver halide growth inhibitors, suitable for use in the present invention, are 1H-purin-6-amine (sold as Adenine by Eastman Kodak Co., Rochester, N.Y.), guanine and 1-phenyl-5-mercaptotetrazole (available as PMT from Fairmount Chemical Co., Inc., Newark, N.J.). A list of growth regulators and stabilizers is provided in U.S. Pat. No. 4,400,463. Alternatively, the silver halide particles may be Ostwald ripened prior to stabilization, so as to produce particles that when activated can form colors ranging in shade from red through brown to gray. Preferably, in either case, the particle size distribution will be very narrow with the grains uniformly sized.

In the preferred embodiment, the silver halide particles formed will be relatively homogeneous in composition, and may be formed as a mixed halide. It is contemplated, however, that the particles can be varied so that the central region may be of a different silver halide composition than the laterally surrounding region. For example, the particles may be formed with an AgI core surrounded by an AgClBr shell. Alternatively, the particles may be formed with an AgClBr core surrounded by an AgI shell.

As an alternative to the mixing of silver and halide salts from aqueous solutions, it is possible to introduce the silver and halide salts initially or in the particle growth stage in the form of fine silver halide grains suspended in a dispersing medium. The grain size is such that they are readily Ostwald ripened onto larger grain nuclei, if any are present once introduced to the reaction vessel.

The silver halide particles are then washed and concentrated using conventional washing techniques to remove excess salts and other soluble materials deleterious to the desired photochromic performance of the silver halide. Ultrafiltration (for example through a Millipore filter with a cutoff as low as 10,000 molecular weight) is the preferred method for washing the silver halide particles because this technique removes not only excess water with dissolved and undesirable salts therein, but by selection of an appropriate molecular weight cut-off may be used to remove a substantial portion of the water-soluble polymer that had been used to provide the protective environment for the formation of the silver halide particles. The silver halide particles may also be washed using flocculation and/or decantation or other techniques known in the art, provided that they do not introduce anionically charged substances that deleteriously react with the multivalent cations subsequently used in the process of the invention to provide photochromic activation.

After washing and concentrating the essentially photochromically inactive silver halide particles, the protective polymer removed in the washing process may be replaced with a higher molecular weight polymer or another protective polymer which does not irreversibly bind halogens. The replacement polymer may be a water-dispersible, film-forming polymer that is mixed with the silver halide grains in the form of an emulsion. Ions such as $Cu^{++}$, $Cu^+$ or combinations thereof, together with sulfur-bearing ions such as $R-S^-$, $S_2O_3^=$, $S^=$, or combinations thereof, are added to the emulsion in a concentration of $10^2$ to $10^5$ parts per million (based on the silver content of the emulsion) to serve as photoactivating agents. Alternatively, in lieu of or in addition to sulfur-bearing ions as activating agents, one can also use a mild reducing agent, such as ascorbic acid, having a redox potential of less than about 235 mv. at pH 6.5 (measured against a standard hydrogen electrode), provided also that the reducing agent chosen does not impair the colloidal qualities, particularly the silver halide particle size on the emulsion. Such reducing agents are added in an amount between 0.01 to 50 mol percent based on the weight of silver. In the preferred embodiment of the present invention, photoactivation of the particles is accomplished by a combination of cupric halide and sulfur-containing compounds such as $Na_2S_2O_3$, $Na_2S$ or, surprisingly, 1-phenyl-5-mercaptotetrazole (PMT) or other mercapto-containing compounds, although PMT in conventional photographic systems is considered a potent inhibitor of photosensitive activity. The activating ions surface dope the silver halide particles to maximize their photosensitivity and photochromic properties. For example, the concentration at which copper ions are added to the emulsion is believed to control, at least within a range of speeds, the degree of the reversibility of the photochromic reaction. The sulfur is believed to improve the quantum efficiency of the photochromic reaction.

Polymers which meet the requirements for reversibly donating halogen back to the hydrolyzed silver on removal of irradiation are those which loosely bind halide ion, and which are capable of donating back the halogen on removal of radiation. The reverse reaction will also be enhanced by arranging to have the polymer contain at least 50% halogenated groups. Some examples of useable polymers include but are not limited to poly-4-vinyl pyridine, poly-2-vinyl pyridine, polyvinyl pyridine halides, polyvinyl imidazoles, polylysine, polyvinyl alcohol, polyvinyl pyrrolidone, polyvinylidine chloride, polyvinyl chloride, polyethers, polycarboxylic acids, polysulphonic acids, polymeric quaternary ammonium halides such as polyvinylbenzyl trimethylammonium chloride and polyvinyl pyridium halides, cellulosic carboxylates, cellulosic sulphates, cellulosic ethers, copolymers thereof and mixtures thereof.

Surfactants such as lauroamphodipropionate (commercially available as Miranol $H_2M$-SF from Miranol Inc., South Brunswick, N.J.), sodium dioctyl sulfosuccinate (commercially available as Aerosol OT from American Cyanamid, Wayne, N.J.), and octylphenoxy polyethoxy ethanol (commercially available as Triton X-100 from Rohm and Haas, Philadelphia, Pa.), may be added to the emulsion to promote wetting of the polymer substrate during coating.

The resulting emulsion of surface-activated silver halide in suspension with a suitable polymer as described above is preferably held at a final pH of less than about 6.5, preferably in the range of 3.0 to 4.5, the value being adjusted by addition of the $CuCl_2$ or by buffering with acetic acid or hydrochloric acid. This emulsion can then be cast as a film on glass or other non-adherent substrate, followed by drying to remove substantially all water or other solvents or suspending phase and stripping the dried emulsion from the substrate to provide an unsupported membrane. Alternatively, the emulsion can be coated onto an appropriate polymeric, transparent substrate film and dried. The photochromic emulsion may be coated onto a substrate by dipping, spraying, spin coating, flow coating, or the like to form a continuous polymeric membrane of between 1–30 microns on the surface. The membrane or film, with or without the use of solvents or adhesives, can then be bound, for example as a plastic laminate, between eyeglass lens elements formed for example from polycarbonate, cellulose acetate butyrate, polyester, polyvinylchloride, CR-39 stock or the like, or adhered to glass or polymeric window panes, or onto other light transmissive materials. The percent luminous transmittance in the presence of actinic radiation of the final laminate may be varied by adjusting the thickness of the polymeric membrane, the amount of activation, and the concentration of the photochromic material.

The present invention is further illustrated by the following examples, but these examples should not be used to limit the present invention.

EXAMPLE 1

A first solution was prepared by mixing together 2.0 ml. of 1% w/v polyoxypropylene-polyoxyethylene block copolymer (commercially available as Pluronic 31R1 from BASF Wyandote Corporation, Parsippany, N.J.; CAS Registry #9003-11-6), 60.0 ml. of 1% w/v sodium dioctyl sulfosuccinate (commercially available from American Cyanamid Industrial Chemicals Division, Wayne, N.J.; CAS Registry #577-11-7), and 100.0 ml. of 1.00M $AgNO_3$. This mixture was then mixed, with continuous stirring into 83.0 ml. of high viscosity, w/v (i.e. 5 g. dry weight) polyvinyl alcohol (e.g. Elvanol HV commercially available from E.I. duPont de Nemours Co.; CAS Registry #9002-89-5), and deionized water added to 1000 ml.

A second solution was also prepared by mixing together 2.0 ml. of the same 1% w/v polyoxypropylene-polyoxyethylene block copolymer, 40.0 ml. of 1.00M KBr, 60.0 ml. of 1.00M NaCl, 5.00 ml. of 1.00M KI and 30.0 ml. of the same 1% w/v sodium dioctyl sulfosuccinate. This mixture was also mixed with continuous stirring into 83.0 ml. of the same 6% w/v polyvinyl alcohol and deionized water added to 1000 ml.

The first and second solutions were then simultaneously jetted into the inlet side of a centrifugal pump at 400 and 440 ml/min, respectively. The resulting emulsion, containing AgClBrI particles, was discharged into 1000 ml. of well stirred, deionized water in a 4 liter beaker.

After 30 minutes at room temperature, 20.0 ml of adenine (0.0037M) was added in drops over 5 minutes as a stabilizer to help eliminate further crystal growth. The size of the particles was estimated to be substantially less than 1000 Å. The dispersion was ultrafiltered using a commercially available Millipore Minitan Tangential Flow System with a 30,000 molecular weight cut-off. The volume of the retentate emulsion recovered after ultrafiltration was 300 ml. and was a clear pale beige. The silver concentration was analyzed as 0.244 meq/ml.

EXAMPLE 2

An emulsion prepared as above was then employed in the preparation of a film as follows:

A film-forming dispersion was made by mixing a water soluble polymer in the form of 4.30 ml. of medium-low viscosity, 7% w/v (i.e. 0.3 g. dry weight) polyvinyl alcohol (e.g. Elvanol 90-50 from E.I. duPont de Nemours Co.), a surfactant in the form of 0.50 ml. 3% w/v octylphenoxy polyethoxy ethanol (commercially available from Rohm & Haas Co., Philadelphia, Pa. as Triton X-100; CAS Registry #9002-93-1); and surface doping sensitizers in the form of 0.50 ml. of 0.100M $Na_2S_2O_3$ and 0.25 ml. of 1.00M $CuCl_2$, all being added with rapid stirring to 3.60 g. of the emulsion prepared as in Example 1.

The dispersion was applied at 5.5 ml/30 in$^2$ on subbed 4 mil polyester substrates and a #18 Meyer rod was used to remove the excess from the substrate. After drying, the resulting membrane was evaluated using the light source of an X-Rite 309 densitometer as the exposure device, the spectral characteristics of such source being shown as FIG. 1. A filtered reading head was used for recording the optical density in the visible region from 420 nm to 725 nm (designated N in Table 1 below); in the red absorbing region 570 nm to 725 nm (designated R in Table 1); in the green region 475 nm to 650 nm (designated G in Table 1); and in the blue absorbing region 370 nm to 535 nm (designated B).

Immediately after preparation of the films, the initial optical density was recorded, the films were exposed for 60 seconds to the light source, and the new optical density recorded. The films were then microwaved for two minutes at maximum setting in a commercial Litton microwave oven to remove any residual moisture in the film. The initial optical density was read, the films were exposed for 60 seconds to the light source, and the new optical density recorded. The optical density of the films were re-evaluated after a 24 hour exposure. The densitometer readings are recorded in Table 1.

Note the increase in density of 0.23N occurring after one minute exposure to the light source. The spot bleached rapidly.

The film was also exposed to bright indirect sunlight through a single pane of glass in a south-southeastern facing window between the hours of 11:00 AM and 2:00 PM in early January in New England. A Corning Photobrown Extra photochromic glass lens was simultaneously exposed and used as a comparison. Densitometer readings were taken every minute for the first five minutes and at five minute intervals thereafter until thirty minutes elapsed time and again at 45, 60, 90 and 120 minutes. The color of the film was recorded and the film was then placed in a dark container. Densitometer readings were taken every minute for the first five minutes and thereafter the same sequence of readings were followed as in exposure to sunlight. The densitometer results are recorded in Table 2.

Significant differences to be considered when evaluating the data are: the film of the invention was a membrane about 5 micrometers thick, coated onto a 4 mil polyester base—the glass lens was about 2 mm thick—the analyzed silver content of the film was 0.195 g/ft$^2$ against about 1.14 g/ft$^2$ calculated from the data provided in U.S. Pat. No. 4,251,278. It can be seen that the film is not only thinner and lighter than the glass lens but is more active per unit weight of silver, increasing by 0.12N density units in 5 minutes of exposure compared to 0.26 for the lens, 34% vs. 60% of the total increase over the two hour period.

EXAMPLE 3

A film was prepared as described in Example 2, except that no $Na_2S_2O_3$ was used as a sensitizer. Water was used to compensate to constant volume. The film was tested as described in Example 2; the resulting densitometer readings are recorded in Table 1 which shows a negligible increase of 0.03N density units. A comparison with Corning PhotoBrown Extra photochromic glass is shown in Table 2.

EXAMPLE 4

A film was prepared as described in Example 2, except that no $CuCl_2$ was used as a sensitizer. Water was used to compensate to constant volume. The film was tested as described in Example 2; the resulting densitometer readings are recorded in Table 1 which shows that the film darkened by 0.14N units but it did not subsequently bleach. A comparison with a photochromic glass is shown in Table 2.

EXAMPLE 5

A film was prepared as described in Example 2, except that neither $Na_2S_2O_3$ nor $CuCl_2$ or any other sensitizer was used. Water was used to compensate to constant volume. The film was tested as described in Example 2; the resulting densitometer readings are recorded in Table 1 showing a negligible darkening. The exposed spot did not bleach in 24 hours of darkness. Table 2 provides comparative data between this film and a photochromic glass.

EXAMPLE 6

A film was prepared as described in Example 2, except that 0.25 ml of 1.00M $FeCl_3$ was substituted for the $CuCl_2$. Water was used to compensate to constant volume. The film was tested as described in Example 2; the resulting densitometer readings are recorded in Table 1. The exposed spot did not bleach in 24 hours of darkness.

EXAMPLE 7

A film was prepared as described in Example 2, except that 0.25 ml of 1.00M $CoCl_2$ was substituted for the $CuCl_2$. Water was used to compensate to constant volume. The film was tested as described in Example 2: the resulting densitometer readings are recorded in Table 1. The exposed spot darkened only slightly.

EXAMPLE 8

A film was prepared as described in Example 2, except that 0.25 ml of 1.00M $NiCl_2$ was substituted for the $CuCl_2$. Water was used to compensate to constant volume. The film was tested as described in Example 2; the resulting densitometer readings are recorded in Table 1. The exposed spot darkened only slightly.

EXAMPLE 9

A film was prepared as described in Example 2, except that 0.25 ml of 1.00M $CuBr_2$ was substituted for the $CuCl_2$. Water was used to compensate to constant volume. The film was tested as described in Example 2: the resulting densitometer readings are recorded in Table 1. The exposed spot darkened only slightly. A comparison with a photochromic glass is shown in Table 2.

EXAMPLE 10

A film was prepared as described in Example 2, except that no $Na_2S_2O_3$ was used and 0.25 ml of 1.00M $FeCl_3$ was substituted for the $CuCl_2$. Water was used to compensate to constant volume. The film was tested as described in Example 2; the resulting densitometer readings are recorded in Table 1. The exposed spot darkened but did not bleach.

EXAMPLE 11

A film was prepared as described in Example 2, except that no $Na_2S_2O_3$ was used and 0.25 ml of 1.00M $CoCl_2$ was substituted for the $CuCl_2$. Water was used to compensate to constant volume. The film was tested as described in Example 2; the resulting densitometer readings are recorded in Table 1. The exposed spot darkened but did not bleach.

EXAMPLE 12

A film was prepared as described in Example 2, except that no $Na_2S_2O_3$ was used and 0.25 ml of 1.00M $NiCl_2$ was substituted for the $CuCl_2$. Water was used to compensate to constant volume. The film was tested as described in Example 2; the resulting densitometer readings are recorded on forth in Table 1. The exposed spot darkened but did not bleach.

EXAMPLE 13

A first solution was prepared by diluting 1.00M potassium iodide with deionized water to form 20 ml. of a 0.100M aqueous solution, and then mixing it with 571 ml. of (7% w/v) polyvinyl alcohol (40.0 g. dry wt.), a ml. of Pluronic 31R1 (1% w/v) being added as a foam suppressor.

A second solution was formed using 730 ml. of deionized water to which was added 20 ml. of 0.100 molar $AgNO_3$ aqueous solution.

The two solutions were then mixed with one another in a baffled 2L beaker over a 30 second period, stirred for one hour and filtered. The resulting emulsion of $AgI_2$ crystals has a pH of 5.90 and was very transparent. As a crystal growth inhibitor, 0.10 ml of 1% w/v 1-phenyl-5-mercaptotetrazole (PMT) in a 1:1 isopropyl alcohol:water solution was added.

The foregoing emulsion was converted to one of AgClBrI crystals with iodide cores as follows:

A third solution is prepared by diluting 80 ml. of 1.00M $AgNO_3$ in 1000.0 ml. of deionized water. A fourth solution was prepared by mixing 60 ml. of 1.00M KBr aqueous solution with 25 ml. of 1.00M NaCl aqueous solution into 1065 ml. of deionized water with 5 ml. of 1% w/v of PMT being added thereafter as a growth inhibitor.

The original AgI emulsion was transferred to a baffled 4L beaker equipped with a broad blade stirrer. While the emulsion was stirring vigorously, the third and fourth solutions were simultaneously jetted into the original emulsion at 155 ml. per minute and 165 ml. per minute, respectively. The resulting emulsion was yellow, has a pH of 5.65 and was less transparent than the initial AgI seed emulsion.

The dispersion was ultrafiltered using a Millipore Minitan Tangential Flow System with a 10,000 molecular weight cut-off polysulphone membrane and 20 lbs pressure. The initial approximate 4L volume was reduced to approximately one liter and then washed with 14 one liter portions of deionized water. The final volume was then adjusted to 500 ml., and exhibited a pH of 5.49, an Ag concentration of 1.94% w/v (0.180 meq/ml), and contained 5.0% PVA.

EXAMPLE 14

A film-forming dispersion was made by mixing 0.50 ml. of 3% w/v octylphenoxy polyethoxy ethanol surfactant (Triton X-100 obtainable from Rohm & Haas Co., Philadelphia, Pa.) and 0.10 ml. of sodium dioctyl sulfosuccinate surfactant (Aerosol OT) with 3.6 ml. of the emulsion of Example 13. To the foregoing was then added 0.5 ml. of 0.10M $Na_2S_2O_3$ and 0.25 ml. of 1.00M $CuCl_2$ as surface-doping sensitizers, and 4.2 ml. of deionized water.

5.5 ml. of the dispersion was applied to 30 $in^2$ of 4 mil polyester base and a #18 Meyer rod used to remove the excess. After drying, the membrane was evaluated using the light source described in Example 2. The initial optical density of the films and the optical density after a 60 second exposure were recorded. The films were microwaved for two minutes at maximum setting to remove all water and optical density as in Example 2 was recorded. The optical densities obtained can be found in Table 3.

EXAMPLE 15

A film was prepared as described in Example 14, except that the $Na_2S_2O_3$ was replaced with the same amount of 0.100M $Na_2S$. The film was tested as described in Example 2; the resulting densitometer readings are recorded in Table 3.

EXAMPLE 16

A film was prepared as described in Example 14, except that the $Na_2S_2O_3$ was replaced with 0.25 ml. of 0.100M $Na_2S$, 0.025 ml. of water being added to adjust. The film was tested as described in Example 2; the resulting densitometer readings are recorded in Table 3.

EXAMPLE 17

A film was prepared as described in Example 14, except that the $Na_2S_2O_3$ was replaced with 1.00 ml. of 0.056M (1% w/v) PMT, water being adjusted to 3.70 ml. The film was tested as described in Example 2: the resulting densitometer readings are recorded in Table 3.

EXAMPLE 18

A film was prepared as described in Example 14, except that the $CuCl_2$ was not used and water was adjusted to 3.95 ml. The film was tested as described in Example 2; the resulting densitometer readings are recorded in Table 3.

EXAMPLE 19

A first solution was prepared by mixing together 8.0 ml. of 1% w/v polyoxypropylene-polyoxyethylene block copolymer (commercially available as Pluronic 31R1 from BASF Wyandote Corporation, Parsippany, N.J.; CAS Registry #9003-11-6) with 2500 ml. of deionized water, and adding 400.0 ml. of 1.00M $AgNO_3$. This mixture was then mixed, with continuous stirring into 400.0 ml. of medium-low viscosity, 5% w/v polyvinyl alcohol (e.g. Elvanol 90-50 commercially available from E.I. duPont de Nemours Co.; CAS Registry #9002-89-5), and deionized water added to 7000 ml. to provide a solution of pH 5.44.

A second solution was also prepared by mixing together in 2500 ml. of deionized water, 8.0 ml. of the same 1% w/v polyoxypropylene-polyoxyethylene block copolymer, 160.0 ml. of 1.00M KBr, 220.0 ml. of 1.00M NaCl, 20.00 ml. of 1.00M KI and 532.0 ml. of 1% w/v sodium dioctyl sulfosuccinate. This mixture was also mixed with continuous stirring into 400.0 ml. of the same 6% w/v polyvinyl alcohol and deionized water added to 7000 ml. The pH was 5.78.

The first and second solutions were then simultaneously jetted into the inlet side of a mixing device at 1800 ml./min. with a residence time of 0.28 milliseconds. The resulting mixture was collected in a stirred 20 liter container. One liter portions of deionized water were used to rinse the containers used for the first and second solutions. 560 ml. of 0.05M 1-phenyl-5-mercaptotetrazole was simultaneously jetted into the stirred mixture at a rate of 35 ml./min.

The dispersion was ultrafiltered and concentrated to 2 liters using a commercially available cellulose acetate membrane with a 10,000 molecular weight cut-off. Seven approximately 1 liter aliquots of deionized water were added during ultrafiltration, by diluting to 3 liters and reconcentrating to 2 liters. Finally, the dispersion was concentrated to 638 ml., an additional 5.0 ml. of the same polyoxypropylene/polyoxyethylene block copolymer being added as a foam suppressant, and the dispersion reduced to 400 ml. The dispersion was drained from the unit using approximately 600 ml. of deionized water to flush the unit, and the dispersion was filtered through five #541 Whatman filter papers and bottled.

Analysis indicated that the final dispersion yielded 0.354 meq/ml. of Ag, had a pH of 5.6 and a conductivity of 82.0 micromhos/cm.

EXAMPLE 20

An emulsion prepared as in Example 19 was then employed in the preparation of a film as follows:

A film-forming dispersion was made by mixing with 2.00 ml. of water, a water soluble polymer in the form of 1.00 ml. of 10% polyvinylpyrrolidone K-30, a surfactant in the form of 0.20 ml. 3% w/v octylphenoxy polyethoxy ethanol (commercially available from Rohm & Haas Co., Philadelphia, Pa. as Triton X-100; CAS Registry #9002-93-1); and surface doping sensitizers in the form of 1.00 ml. of 0.100M $Na_2S_2O_3$, 1.00 ml. of 1.00M $CuCl_2$, and an agent, 3 00 ml. of 0.100M benzyltrimethylammonium chloride, to control the rapidity of clearing, all being added with rapid stirring and then adding 11.3 ml. to the emulsion prepared as in Example 19. The pH was 4.0.

The dispersion was spread uniformly at 3.0 ml./30 $in^2$ on cellulose acetate butyrate substrates. After drying, the film was treated in a microwave oven for 2 minutes at full power The film was evaluated as described in Example 2, but using, as the exposure device, a solar simulator filtered to provide approximately air mass 1. The densitometer readings are recorded in Table 4.

EXAMPLE 21

A film was prepared as described in Example 20, except that 0.50 ml. of a mild reducing agent, 1.00N ascorbic acid, was added. Initial water was reduced to 1.50 ml. to compensate to constant volume. The film was tested as described in Example 20; the resulting densitometer readings are recorded in Table 4.

EXAMPLE 22

A film was prepared as described in Example 21, except that no $Na_2S_2O_3$ was used as a sensitizer. Initial water used was 2.50 ml. to compensate to constant volume. The film was tested as described in Example 20; the resulting densitometer readings are recorded in Table 4.

TABLE 1

| Example | 2 | | | | 3 | | | | 4 | | | | 5 | | | | 6 | | | | 7 | | | |
|---|---|---|---|---|---|---|---|---|---|---|---|---|---|---|---|---|---|---|---|---|---|---|---|---|
| Condition | N | R | G | B | N | R | G | B | N | R | G | B | N | R | G | B | N | R | G | B | N | R | G | B |
| Initial Reading | 05 | 04 | 04 | 08 | 04 | 03 | 03 | 07 | 13 | 11 | 15 | 26 | 04 | 03 | 03 | 05 | 03 | 04 | 04 | 17 | 22 | 21 | 24 | 30 |
| 1' X-RITE 309 | 28 | 21 | 35 | 44 | 07 | 06 | 07 | 10 | 27 | 22 | 32 | 46 | 07 | 06 | 08 | 10 | 14 | 12 | 15 | 25 | 50 | 49 | 53 | 59 |
| Difference | 23 | 17 | 31 | 36 | 03 | 03 | 04 | 03 | 14 | 11 | 17 | 20 | 03 | 03 | 05 | 05 | 11 | 08 | 11 | 08 | 28 | 28 | 29 | 29 |
| 2' microwave | | | | | | | | | | | | | | | | | | | | | | | | |
| Initial Reading | 05 | 05 | 04 | 08 | 04 | 04 | 04 | 07 | 13 | 11 | 15 | 26 | 04 | 03 | 03 | 05 | 03 | 04 | 04 | 17 | 23 | 22 | 25 | 32 |
| 1' X-RITE 309 | 29 | 22 | 36 | 44 | 07 | 06 | 07 | 11 | 27 | 23 | 31 | 45 | 07 | 06 | 07 | 09 | 13 | 12 | 14 | 24 | 48 | 47 | 50 | 55 |
| Difference | 24 | 17 | 32 | 36 | 03 | 02 | 03 | 04 | 14 | 12 | 16 | 19 | 03 | 03 | 04 | 04 | 10 | 08 | 10 | 07 | 25 | 25 | 25 | 23 |
| 24 hours | | | | | | | | | | | | | | | | | | | | | | | | |
| Initial Reading | 04 | 05 | 04 | 07 | 03 | 04 | 03 | 06 | 13 | 12 | 15 | 25 | 03 | 04 | 03 | 04 | 04 | 04 | 04 | 16 | 24 | 23 | 26 | 32 |
| 1' X-RITE 309 | 18 | 17 | 19 | 22 | 06 | 06 | 05 | 08 | 26 | 23 | 29 | 39 | 05 | 05 | 04 | 05 | 11 | 11 | 12 | 21 | 47 | 46 | 48 | 55 |
| Difference | 14 | 12 | 15 | 15 | 03 | 02 | 02 | 02 | 13 | 11 | 14 | 14 | 02 | 01 | 01 | 01 | 07 | 07 | 08 | 05 | 23 | 23 | 22 | 23 |

| | Example | 8 | | | | 9 | | | | 10 | | | | 11 | | | | 12 | | | |
|---|---|---|---|---|---|---|---|---|---|---|---|---|---|---|---|---|---|---|---|---|---|
| | Condition | N | R | G | B | N | R | G | B | N | R | G | B | N | R | G | B | N | R | G | B |
| | Initial Reading | 22 | 21 | 23 | 30 | 07 | 07 | 08 | 14 | 03 | 03 | 03 | 17 | 03 | 04 | 04 | 05 | 03 | 04 | 03 | 05 |
| | 1' X-RITE 309 | 47 | 46 | 48 | 54 | 17 | 15 | 19 | 26 | 15 | 12 | 19 | 32 | 05 | 05 | 05 | 06 | 05 | 05 | 05 | 07 |
| | Difference | 25 | 25 | 25 | 24 | 10 | 08 | 11 | 12 | 12 | 09 | 16 | 15 | 02 | 01 | 01 | 01 | 02 | 01 | 02 | 02 |
| | 2' microwave | | | | | | | | | | | | | | | | | | | | |
| | Initial Reading | 22 | 21 | 24 | 31 | 07 | 07 | 08 | 14 | 03 | 03 | 03 | 17 | 04 | 04 | 04 | 05 | 03 | 04 | 03 | 05 |
| | 1' X-RITE 309 | 46 | 45 | 47 | 52 | 16 | 14 | 17 | 23 | 12 | 10 | 14 | 25 | 05 | 05 | 05 | 06 | 05 | 05 | 05 | 07 |
| | Difference | 24 | 24 | 23 | 21 | 09 | 07 | 09 | 09 | 09 | 07 | 11 | 08 | 01 | 01 | 01 | 01 | 02 | 01 | 02 | 02 |
| | 24 hours | | | | | | | | | | | | | | | | | | | | |
| | Initial Reading | 22 | 21 | 23 | 20 | 08 | 08 | 08 | 14 | 03 | 03 | 03 | 17 | | | | | 03 | 03 | 03 | 04 |
| | 1' X-RITE 309 | 45 | 44 | 45 | 51 | 13 | 13 | 14 | 19 | 09 | 08 | 10 | 20 | | | | | 04 | 05 | 04 | 05 |
| | Difference | 23 | 23 | 22 | 21 | 05 | 05 | 06 | 05 | 06 | 05 | 07 | 03 | | | | | 01 | 02 | 01 | 01 |

TABLE 2

| Example | 2 | | | | 3 | | | | 4 | | | | 5 | | | | 9 | | | | Corning Photo Brown Extra | | | |
|---|---|---|---|---|---|---|---|---|---|---|---|---|---|---|---|---|---|---|---|---|---|---|---|---|
| Conditions | N | R | G | B | N | R | G | B | N | R | G | B | N | R | G | B | N | R | G | B | N | R | G | B |
| Sunlight Exposure 11:00 AM-2:00 pm | | | | | | | | | | | | | | | | | | | | | | | | |
| Before Exposure | 05 | 05 | 04 | 08 | 04 | 03 | 03 | 07 | 15 | 13 | 17 | 28 | 04 | 03 | 03 | 05 | 09 | 08 | 09 | 15 | 05 | 05 | 05 | 07 |
| 1' | 10 | 10 | 11 | 14 | 04 | 04 | 04 | 07 | 21 | 18 | 24 | 35 | 04 | 04 | 03 | 05 | 13 | 12 | 13 | 19 | 19 | 17 | 20 | 23 |
| 2' | 13 | 12 | 14 | 17 | 05 | 04 | 05 | 08 | 22 | 20 | 25 | 36 | | | | | 13 | 13 | 13 | 18 | 25 | 23 | 27 | 30 |
| 3' | 15 | 14 | 16 | 19 | 04 | 04 | 04 | 08 | 24 | 21 | 27 | 38 | 04 | 04 | 04 | 05 | 14 | 13 | 14 | 19 | 27 | 25 | 31 | 34 |
| 4' | 16 | 14 | 17 | 20 | 04 | 04 | 04 | 08 | 24 | 21 | 28 | 39 | 04 | 04 | 04 | 05 | 14 | 13 | 14 | 19 | 28 | 26 | 32 | 36 |
| 5' | 17 | 16 | 18 | 21 | 05 | 05 | 05 | 08 | 26 | 22 | 29 | 40 | 04 | 04 | 04 | 05 | 14 | 14 | 14 | 19 | 31 | 28 | 34 | 38 |
| 10' | 23 | 21 | 25 | 29 | 05 | 05 | 06 | 09 | 29 | 24 | 33 | 44 | 05 | 04 | 04 | 06 | 15 | 15 | 15 | 19 | 40 | 35 | 44 | 49 |
| 15' | 24 | 21 | 26 | 29 | 07 | 07 | 08 | 11 | 30 | 25 | 34 | 36 | 05 | 04 | 04 | 06 | 15 | 15 | 15 | 20 | 42 | 38 | 47 | 52 |
| 20' | 28 | 25 | 31 | 35 | 07 | 06 | 07 | 10 | 31 | 26 | 36 | 48 | 05 | 04 | 06 | 06 | 15 | 15 | 15 | 20 | 44 | 39 | 48 | 54 |
| 25' | 25 | 22 | 28 | 31 | 08 | 07 | 09 | 12 | 31 | 26 | 36 | 47 | 05 | 04 | 05 | 07 | 15 | 15 | 15 | 20 | 44 | 39 | 49 | 55 |
| 30' | 26 | 23 | 29 | 32 | 09 | 08 | 10 | 13 | 33 | 27 | 37 | 50 | 05 | 04 | 05 | 07 | 15 | 15 | 15 | 20 | 44 | 41 | 51 | 55 |

TABLE 2-continued

| Example | 2 | | | | 3 | | | | 4 | | | | 5 | | | | 9 | | | | Corning Photo Brown Extra | | | |
|---|---|---|---|---|---|---|---|---|---|---|---|---|---|---|---|---|---|---|---|---|---|---|---|---|
| Conditions | N | R | G | B | N | R | G | B | N | R | G | B | N | R | G | B | N | R | G | B | N | R | G | B |
| 45' | 29 | 25 | 33 | 35 | 09 | 08 | 10 | 12 | 35 | 29 | 39 | 52 | 06 | 05 | 06 | 07 | 15 | 15 | 15 | 20 | 48 | 42 | 54 | 60 |
| 60' | 32 | 27 | 36 | 38 | 10 | 09 | 11 | 14 | 37 | 30 | 42 | 54 | 07 | 06 | 07 | 08 | 15 | 16 | 15 | 20 | 48 | 43 | 54 | 60 |
| 90' | 36 | 30 | 41 | 43 | 13 | 12 | 15 | 17 | 39 | 33 | 45 | 57 | 07 | 06 | 07 | 08 | 16 | 16 | 16 | 21 | 47 | 43 | 54 | 58 |
| 120' | 39 | 32 | 45 | 47 | 15 | 13 | 17 | 19 | 40 | 34 | 47 | 59 | 07 | 06 | 07 | 09 | 16 | 16 | 16 | 21 | 48 | 42 | 55 | 62 |
| Difference | 34 | 27 | 41 | 39 | 11 | 10 | 14 | 12 | 25 | 21 | 30 | 31 | 03 | 03 | 04 | 04 | 07 | 08 | 07 | 06 | 43 | 37 | 50 | 55 |
| Colour | Med. Brown | | | | Light Grey | | | | Brown | | | | Light Brown | | | | Light Grey | | | | Dark Brown | | | |
| Dark Time Zero | 40 | 33 | 47 | 49 | 18 | 15 | 20 | 22 | 40 | 34 | 46 | 58 | 07 | 06 | 07 | 09 | 16 | 16 | 16 | 21 | 46 | 40 | 52 | 58 |
| 1' | 37 | 29 | 45 | 49 | 16 | 14 | 18 | 21 | 41 | 34 | 47 | 60 | 07 | 06 | 07 | 08 | 13 | 14 | 14 | 19 | 37 | 32 | 43 | 49 |
| 2' | 36 | 27 | 43 | 48 | 16 | 13 | 18 | 21 | 41 | 34 | 47 | 59 | 07 | 06 | 07 | 09 | 13 | 13 | 13 | 18 | 29 | 25 | 34 | 38 |
| 3' | 34 | 26 | 42 | 47 | 15 | 12 | 17 | 20 | 41 | 34 | 47 | 60 | 07 | 06 | 07 | 08 | 12 | 13 | 13 | 18 | 22 | 20 | 26 | 29 |
| 4' | 33 | 24 | 41 | 47 | 15 | 13 | 18 | 20 | 40 | 34 | 47 | 59 | 07 | 06 | 07 | 08 | 12 | 13 | 13 | 18 | 19 | 17 | 21 | 24 |
| 5' | 32 | 24 | 40 | 46 | 16 | 13 | 18 | 21 | 41 | 34 | 47 | 60 | 07 | 06 | 07 | 09 | 12 | 13 | 13 | 18 | 17 | 16 | 20 | 23 |
| 10' | 28 | 20 | 36 | 43 | 15 | 12 | 18 | 21 | 41 | 34 | 47 | 60 | 07 | 06 | 07 | 08 | 11 | 12 | 12 | 18 | 12 | 11 | 15 | 17 |
| 15' | 26 | 18 | 33 | 40 | 14 | 11 | 16 | 20 | 40 | 34 | 46 | 59 | 07 | 06 | 07 | 08 | 11 | 12 | 12 | 17 | 10 | 09 | 11 | 13 |
| 20' | 24 | 17 | 32 | 40 | 14 | 11 | 16 | 20 | 41 | 34 | 47 | 60 | 07 | 06 | 07 | 08 | 11 | 11 | 11 | 16 | 09 | 08 | 10 | 13 |
| 25' | 22 | 16 | 30 | 38 | 13 | 10 | 16 | 19 | 40 | 34 | 47 | 59 | 07 | 06 | 07 | 08 | 11 | 11 | 11 | 17 | 08 | 08 | 09 | 11 |
| 30' | 22 | 15 | 29 | 36 | 14 | 11 | 18 | 21 | 40 | 34 | 47 | 60 | 07 | 06 | 07 | 09 | 11 | 11 | 11 | 16 | 08 | 08 | 09 | 12 |
| 45' | 20 | 14 | 27 | 35 | 12 | 10 | 15 | 18 | 40 | 34 | 47 | 59 | 07 | 06 | 07 | 09 | 11 | 12 | 11 | 16 | 07 | 07 | 08 | 10 |
| 60' | 18 | 12 | 24 | 32 | 11 | 08 | 13 | 17 | 41 | 34 | 47 | 61 | 07 | 06 | 07 | 09 | 10 | 11 | 11 | 16 | 07 | 07 | 08 | 09 |
| 90' | 16 | 11 | 21 | 29 | 09 | 07 | 11 | 14 | 41 | 34 | 47 | 60 | 07 | 06 | 07 | 09 | 09 | 11 | 10 | 16 | 07 | 07 | 07 | 09 |
| 120' | 14 | 10 | 19 | 26 | 10 | 08 | 12 | 16 | 41 | 34 | 47 | 60 | 07 | 06 | 07 | 09 | 10 | 11 | 10 | 15 | 06 | 06 | 07 | 09 |
| Difference | 26 | 23 | 28 | 23 | 08 | 07 | 08 | 06 | (01) | 00 | (01) | (02) | 00 | 00 | 00 | 00 | 06 | 05 | 06 | 06 | 40 | 34 | 45 | 49 |
| 24 hours | 07 | 07 | 08 | 13 | 06 | 06 | 06 | 10 | 39 | 32 | 47 | 61 | 06 | 05 | 06 | 08 | 09 | 09 | 09 | 15 | 05 | 06 | 05 | 06 |
| Difference | 33 | 26 | 39 | 36 | 12 | 09 | 14 | 12 | 01 | 02 | (01) | (03) | 01 | 01 | 01 | 01 | 07 | 07 | 07 | 06 | 41 | 34 | 47 | 52 |

TABLE 3

| Example | 14 | | | | 15 | | | | 16 | | | | 17 | | | | 18 | | | |
|---|---|---|---|---|---|---|---|---|---|---|---|---|---|---|---|---|---|---|---|---|
| Conditions | N | R | G | B | N | R | G | B | N | R | G | B | N | R | G | B | N | R | G | B |
| Initial Reading | 11 | 10 | 11 | 18 | 21 | 20 | 22 | 34 | 15 | 14 | 15 | 24 | 13 | 13 | 13 | 22 | 08 | 08 | 08 | 15 |
| 1' Exposed X-RITE 309 | 19 | 18 | 19 | 25 | 64 | 54 | 72 | 87 | 33 | 30 | 36 | 47 | 32 | 31 | 34 | 40 | 14 | 14 | 15 | 21 |
| Difference | 08 | 08 | 09 | 07 | 43 | 34 | 50 | 43 | 18 | 16 | 21 | 23 | 19 | 18 | 21 | 18 | 06 | 06 | 07 | 06 |
| 2' Microwave | | | | | | | | | | | | | | | | | | | | |
| Initial Reading | 11 | 10 | 11 | 18 | 19 | 18 | 20 | 31 | 15 | 14 | 15 | 24 | 13 | 13 | 14 | 23 | 08 | 08 | 08 | 15 |
| 1' Exposure X-RITE 309 | 16 | 15 | 16 | 22 | 29 | 28 | 30 | 39 | 28 | 27 | 30 | 38 | 30 | 29 | 32 | 39 | 15 | 14 | 15 | 22 |
| Difference | 05 | 05 | 05 | 04 | 10 | 10 | 10 | 08 | 13 | 13 | 15 | 14 | 17 | 16 | 18 | 16 | 07 | 06 | 07 | 07 |

TABLE 4

| Example | 20 | | | | 21 | | | | 22 | | | | Corning Photogray Extra | | | |
|---|---|---|---|---|---|---|---|---|---|---|---|---|---|---|---|---|
| Activity | N | R | G | B | N | R | G | B | N | R | G | B | N | R | G | B |
| Initial | 04 | 04 | 04 | 11 | 04 | 04 | 04 | 10 | 05 | 05 | 04 | 11 | 03 | 04 | 05 | 05 |
| Exposure Time Solar Simulator | | | | | | | | | | | | | | | | |
| 1' | 16 | 14 | 16 | 23 | 09 | 08 | 08 | 15 | 15 | 13 | 15 | 22 | 44 | 46 | 45 | 44 |
| 5' | 51 | 44 | 55 | 57 | 32 | 24 | 36 | 41 | 57 | 48 | 62 | 65 | 47 | 48 | 48 | 47 |
| Dark Time | | | | | | | | | | | | | | | | |
| 1' | 28 | 23 | 31 | 41 | 22 | 15 | 27 | 38 | 45 | 35 | 52 | 61 | 24 | 24 | 26 | 27 |
| 2' | 19 | 16 | 22 | 31 | 18 | 13 | 24 | 35 | 35 | 27 | 43 | 54 | 20 | 20 | 22 | 24 |
| 3' | 14 | 12 | 16 | 25 | 16 | 11 | 21 | 32 | 34 | 25 | 42 | 57 | 18 | 19 | 20 | 21 |
| 4' | 11 | 09 | 12 | 20 | 14 | 10 | 18 | 30 | 29 | 21 | 36 | 50 | 17 | 18 | 20 | 20 |
| 5' | 09 | 07 | 09 | 17 | 12 | 09 | 16 | 27 | 27 | 19 | 35 | 51 | 15 | 15 | 17 | 19 |
| 10' | 05 | 05 | 05 | 11 | 10 | 06 | 10 | 20 | 18 | 12 | 24 | 39 | 13 | 13 | 14 | 17 |
| 15' | | | | | 07 | 05 | 07 | 15 | 15 | 10 | 20 | 35 | 12 | 12 | 13 | 15 |
| 20' | | | | | 05 | 05 | 05 | 12 | 12 | 09 | 16 | 29 | 11 | 11 | 12 | 15 |
| 25' | | | | | 05 | 04 | 04 | 10 | 11 | 08 | 15 | 27 | 10 | 11 | 11 | 13 |

Examples 3 to 5 inclusive indicate that copper or sulfur-bearing ions (or a mild reducing agent in place of the latter) alone provide inadequate sensitization, but the two agents are required. In Examples 6 to 12 inclusive ions of other Period 4 metals were substituted for copper ions, with or without the companion sensitizer, but none of these substitutions provided a functional equivalent for the copper. Of considerable interest is the data in Table 4 showing that the film prepared in Example 20 cleared much more rapidly than the photochromic glass used as a comparison. It is believed that the benzyltrimethylammonium chloride serves as an agent that contributes to a higher electrical conductivity of the microwave-dried film, thus allowing more rapid electron exchange to occur and thus providing superior clearing. The films formed according to Examples 21 and 22 respectively compare the performance of ascorbic acid with and without the presence of the thiosulphate.

Figure 2:
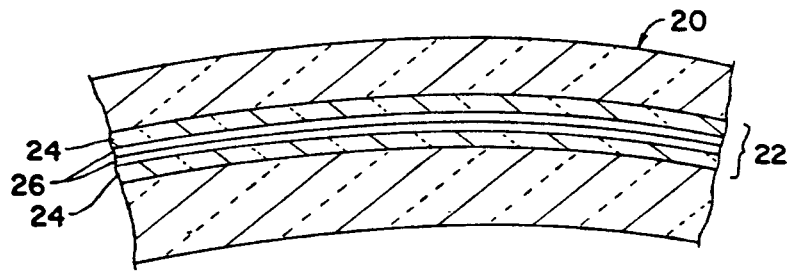
FIG. 2 is a schematic cross-sectional representation of an ophthalmic lens incorporating the membrane of the present invention.
Figure 3:
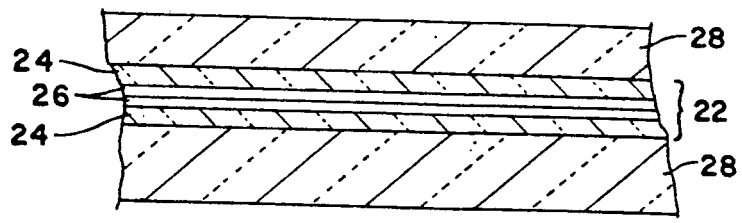
FIG. 3 is a schematic cross-sectional representation of a window pane incorporating the membrane of the present invention.

As noted, one preferred use for the photochromic emulsion is for laminating onto lens elements used to make eyeglass lenses which are clear and transparent in low light. As shown in FIG. 2 in cross-section, such a lens 20, includes laminate 22 formed of a pair of sheets 24 of substrate material such as polyester coated with respective membranes 26 of the emulsion of the invention, the laminate being formed by contacting the emulsion surfaces of the two sheets in face to face relation with one another. The double membrane of dried emulsion is thus protected within the outer layers provided by sheets 24. Laminate 22 then is incorporated by known techniques into appropriate and known polymeric ophthalmic lens materials or transparent resins such as polycarbonates, acryl resins, CR-39 resins, polystyrenes, polyesters, cellulose acetate butyrate and the like. Similarly, one can incorporate laminate 22 between flat panes or sheets 28 of plastics or glass to form photochromic windows as shown in FIG. 3.

Even though the advantages and characteristics of the invention have been set forth in the foregoing description, together with the details of the structure and function of the invention, it is understood that the disclosure is illustrative only. The present invention is indicated by the broad general meaning of the terms in which the appended claims are expressed.

What is claimed is:

1. A photochromic emulsion for coating light transmissive materials comprising:
    photosensitive silver halide particles having dimensions in the range of approximately 50 Angstroms to 800 Angstroms, said silver halide being surface-sensitized; and
    a polymeric colloidal suspending agent for protecting said silver halide particles and reversibly binding halogens produced during photolysis of said silver halide particles.

2. A photochromic emulsion according to claim 1 wherein said silver halide particles are chosen from the group consisting of AgCl, AgBr and AgI and combinations thereof.

3. A photochromic emulsion according to claim 1 wherein said silver halide particles have an AgI core surrounded by an AgClBr shell.

4. A photochromic emulsion according to claim 1 wherein said silver halide particles are surface-doped with ions chosen from the group consisting of $Cu^{++}$, $Cu^+$ and combinations thereof, and also with either or both a mild reducing agent and selected so as not to impair the colloidal qualities of said emulsion, and an ion selected from the group consisting of $R-S^-$, $S_2O_3^=$, $S^=$, or combinations thereof, R being an organic radical.

5. A photochromic emulsion according to claim 4 wherein said ions are added to said emulsion in a range of concentrations of about $10^2$ to $10^5$ parts per million based on the silver content of said emulsion.

6. A photochromic emulsion according to claim 4 wherein said $R-S^-$, $S_2O_3^=$ and $S^=$ ions are provided by one or more compounds chosen from the group of $Na_2S_2O_3$, $Na_2S$, 1-phenyl-5-mercapto-tetrazole and mixtures thereof.

7. A photochromic emulsion according to claim 4 wherein said $S^=$ is provided from $Na_2S_2O_3$ and said silver halide particles are also surface doped with $Cu^{++}$ cations.

8. A photochromic emulsion according to claim 4 wherein said reducing agent is ascorbic acid.

9. A photochromic emulsion according to claim 7 wherein said cations are provided from a water soluble copper halide.

10. A photochromic emulsion according to claim 1 wherein said suspending agent includes a polymeric tertiary amine.

11. A photochromic emulsion according to claim 1 wherein said colloid includes a polymer selected from the group consisting of poly-4-vinyl pyridine, poly-2-vinyl pyridine, polyvinylpyridine halides, polyvinyl imidazoles, polylysine, polyvinyl alcohol, polyvinyl pyrrolidone, polyvinylidine chloride, polyvinyl chloride, polyethers, polycarboxylic acids, polysulphonic acids, polymeric quaternary ammonium halides including polyvinylbenzyl trimethylammonium chloride and polyvinyl pyridium halides, cellulosic carboxylates, cellulosic sulphates, cellulosic ethers, copolymers and mixtures thereof.

12. A photochromic emulsion according to claim 1 wherein said suspending agent is a polymer which contains at least 50% halogenated groups.

13. A photochromic emulsion according to claim 1 wherein said emulsion further comprises:
    a silver halide crystal growth inhibitor.

14. A photochromic emulsion according to claim 13 wherein said crystal growth inhibitor is selected from the group consisting of 1H-purine-6-amine, guanine and 1-phenyl-5-mercapto-tetrazole.

15. A photochromic emulsion according to claim 1 wherein said emulsion is prepared in the presence of less than 10 weight percent of said colloidal suspending agent.

16. A photochromic material comprising:
    a substantially water-free membrane formed by distributing throughout the bulk of a matrix, surface-sensitized photosensitive silver halide particles having dimensions in the range of approximately 50 Angstroms to 800 Angstroms; said matrix comprising essentially a polymer that does not irreversibly bind halogens produced during photolysis of said silver halide particles.

17. A photochromic lens comprising:
    a substantially water-free membrane formed by distributing throughout the bulk of a matrix, surface-sensitized photosensitive silver halide particles having dimensions in the range of approximately 50 Angstroms to 800 Angstroms; said matrix comprising essentially a polymer that does not irreversibly bind halogens produced during photolysis of said silver halide particles; and
    a transparent lens element enclosing said membrane.

18. A photochromic window pane comprising:
    a substantially water-free membrane formed by distributing throughout the bulk of a matrix, surface-sensitized photosensitive silver halide particles having dimensions in the range of approximately 50 Angstroms to 800 Angstroms; said matrix comprising essentially a polymer that does not irreversibly bind halogens produced during photolysis of said silver halide particles; and
    transparent sheet material enclosing said membrane.

* * * * *